(12) United States Patent
Sundar et al.

(10) Patent No.: US 11,105,639 B2
(45) Date of Patent: Aug. 31, 2021

(54) MAP REFINEMENT USING FEATURE EXTRACTION FROM IMAGES

(71) Applicant: Faraday&Future Inc., Gardena, CA (US)

(72) Inventors: Shyam Sundar, San Diego, CA (US); Anupama Kuruvilla, Irvine, CA (US); Michael B. Jagsch, Redondo Beach, CA (US)

(73) Assignee: Faraday&Future Inc., Gardena, CA (US)

( * ) Notice: Subject to any disclaimer, the term of this patent is extended or adjusted under 35 U.S.C. 154(b) by 115 days.

(21) Appl. No.: 16/687,577

(22) Filed: Nov. 18, 2019

(65) Prior Publication Data

US 2020/0284588 A1    Sep. 10, 2020

Related U.S. Application Data

(60) Provisional application No. 62/732,762, filed on Sep. 18, 2018.

(51) Int. Cl.
| | |
|---|---|
| *G01C 21/32* | (2006.01) |
| *G06K 9/00* | (2006.01) |
| *G06T 11/60* | (2006.01) |
| *G01C 21/36* | (2006.01) |
| *H04W 4/44* | (2018.01) |
| *H04W 4/02* | (2018.01) |
| *G06K 9/46* | (2006.01) |

(52) U.S. Cl.
CPC .......... *G01C 21/32* (2013.01); *G01C 21/3685* (2013.01); *G06K 9/00651* (2013.01); *G06K 9/00812* (2013.01); *G06K 9/4633* (2013.01); *G06T 11/60* (2013.01); *H04W 4/023* (2013.01); *H04W 4/44* (2018.02)

(58) Field of Classification Search
CPC .......................... G01C 21/32; G01C 21/3685; G01C 21/3804; G01C 21/3602; G06T 11/60; G06T 11/00; H04W 4/44; H04W 4/023; H04W 4/80; H04W 4/021; H04W 4/024; H04W 4/40; H04W 4/02; G06K 9/4671; G06K 9/00651; G06K 9/00812; G06K 9/4633
See application file for complete search history.

(56) References Cited

U.S. PATENT DOCUMENTS

| | | | |
|---|---|---|---|
| 2012/0056758 A1* | 3/2012 | Kuhlman | G08G 1/14 340/932.2 |
| 2017/0053192 A1* | 2/2017 | Ding | G08G 1/04 |
| 2017/0137024 A1* | 5/2017 | Elie | G06K 9/00812 |
| 2017/0213463 A1* | 7/2017 | Mizes | G06T 7/254 |

* cited by examiner

*Primary Examiner* — Christopher M Brandt
(74) *Attorney, Agent, or Firm* — Veros Legal Solutions LLP

(57) ABSTRACT

The present disclosure relates to refining maps for vehicles, for example using feature extraction to identify parking areas and their contents from high resolution satellite or drone images. Such maps can be useful for autonomous valet parking (AVP) features of autonomous vehicles.

19 Claims, 4 Drawing Sheets

MAP REFINEMENT USING FEATURE EXTRACTION FROM IMAGES

CROSS-REFERENCE TO RELATED APPLICATIONS

This application claims the benefit of U.S. Provisional Application No. 62/732,762, filed Sep. 18, 2018, the entirety of which is hereby incorporated by reference.

TECHNICAL FIELD

The systems and methods disclosed herein are directed to generating maps, and, more particularly, to generating and refining maps using feature extraction from satellite or drone images to identify parking areas along with their physical boundaries such as walls or fences, pathways to access parking spaces, and obstructions in the parking spaces.

BACKGROUND

Autonomous valet parking (AVP) is a self-driving vehicle feature wherein the vehicle navigates on its own in a parking area, finds itself an available parking space and parks itself. The feature enables a vehicle owner to exit the vehicle at the entrance of a parking area and command the vehicle to park itself. Later, the owner can command the vehicle to come and pick them up at the same spot where it dropped them off. This is considered a time-saving convenience feature of autonomous vehicles.

SUMMARY

The mapping and refinement generation techniques disclosed herein have several features, no single one of which is solely responsible for its desirable attributes. Without limiting the scope as expressed by the claims that follow, certain features of the mapping and refining generation techniques will now be discussed briefly. One skilled in the art will understand how the features of these techniques provide several advantages over traditional systems and methods.

One aspect of the invention relates to a system for refining maps for vehicles, the system comprising: one or more processors in communication with a vehicle; wherein the one or more processors are configured to: receive location data from the vehicle; retrieve map data associated with the location data, the map data including a previously-generated map; retrieve image data corresponding to the location data, the image data including an image of a portion of Earth's surface; perform feature extraction on the image data to identify one or more parking spots; generate a refined map by revising the previously-generated map to include the one or more parking spots; store the refined map as the map data associated with the location data; and transmit the map data associated with the location data to the vehicle.

Another aspect of the invention relates to a method of refining a map, comprising: determining a location of a vehicle; retrieving a map associated with the location, the map being previously-generated; retrieving an image of a portion of Earth's surface corresponding to the location; performing feature extraction on the image to identify one or more parking spots; revising the previously-generated map to include the one or more parking spots; storing the revised map as the map associated with the location; and transmitting the map associated with the location to the vehicle.

DETAILED DESCRIPTION

Figure 1:
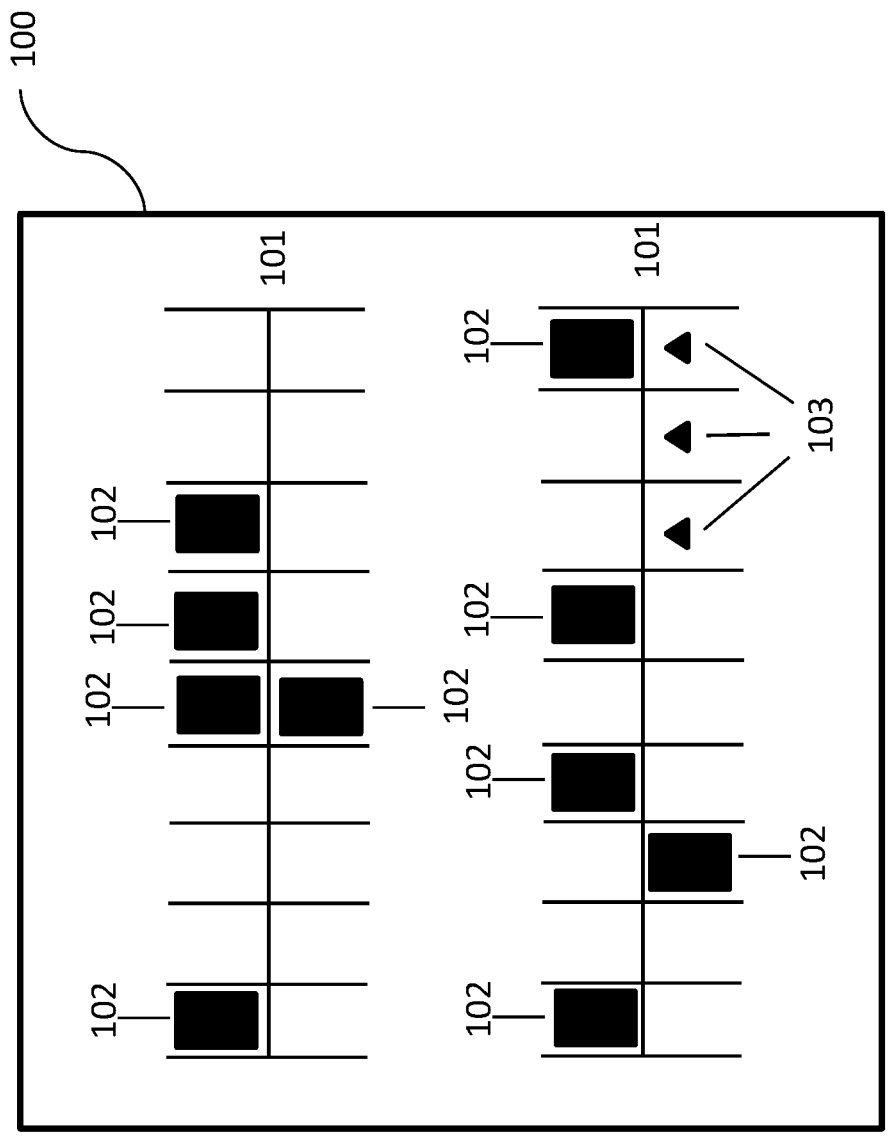
FIG. 1 depicts an exemplary parking area according to examples of this disclosure.

Generally described, the present disclosure relates to generating and refining high definition (HD) maps, for example using feature extraction to identify parking areas (e.g., parking structures) and their contents from high resolution satellite or drone images. Such maps can be useful for autonomous valet parking (AVP) features of autonomous vehicles.

The size, shape, and configuration of parking areas can vary greatly. For example, some parking areas are open-air parking lots and others are closed multi-story or underground parking structures. The techniques described in this application can be used in any of these parking areas. Existing methods are available for autonomous vehicles to navigate parking areas. For example, autonomous vehicles can use their own sensors—for example, cameras, radars, LIDARs, ultrasound sensors—as well as external aids such as signage, radio beacons, etc., to find their current position, or localization, in the parking area. The car's current position can assist in planning their path to an available empty parking space located in the parking area. This method of using sensors to navigate is sometimes called simultaneous localization and mapping (SLAM).

To navigate around a parking area's space, autonomous vehicles may rely on detailed high definition (HD) maps of the space as a navigation aid to augment the SLAM technique. HD maps depict a static view of the space with some of the static obstacles and boundaries, such as walls and fences, captured. However, they do not capture all dynamic details such as parked cars, pedestrians, moving obstacles, etc. Even with static obstacles and boundaries, HD maps may not capture 100% of the details due to limitations of the method used to create the HD map. For example, an HD map created from high resolution aerial images may not capture obstacles such as thin fences which could obstruct the path of the vehicle.

HD maps of parking areas are usually very cumbersome to create. For example, most methods require a human-driven car to make a complete drive around the space with a full suite of sensors engaged (e.g., cameras, radars, LIDARs, ultrasound sensors). The car has to record the signals from the sensors into a high-capacity storage medium for post-processing. The recorded data must later be post-processed to create a HD map of the parking area. Only then can the HD map be used by autonomous vehicles as an aid to SLAM.

Due to the extent of driving, recording and post-processing required, creating an HD map of each parking area is a very time-consuming and expensive process. Indeed, creating HD maps of all available parking spaces in a given region can be prohibitively expensive for any automotive OEM who plans to build cars that support the autonomous valet parking (AVP) feature. The prohibitive cost of creating HD maps on a global scale to enable autonomous valet parking (AVP) in all vehicles is a deterrent to the deployment of the AVP feature.

The aforementioned problems, among others, are addressed in some embodiments by the disclosed map generation methods. Unlike previous methods, the invention outlined in the present disclosure allows for the automated creation of HD maps on a very large global scale without the need for a vehicle to drive through the parking area.

FIG. 1 depicts an exemplary parking area 100. As shown in FIG. 1, the exemplary parking area 100 may include groups of parking lines 101, vehicles 102 (e.g., parked inside parking lines 101), and signage 103 (e.g., disabled parking signs, electric vehicle signs, etc.) Methods of the present invention may use the parking lines 101, vehicles 102, and/or signs 103 to recognize parking lots along with their physical boundaries such as walls or fences, pathways to access the parking spaces, and obstructions in the spaces, as described in further detail below.

Figure 2:
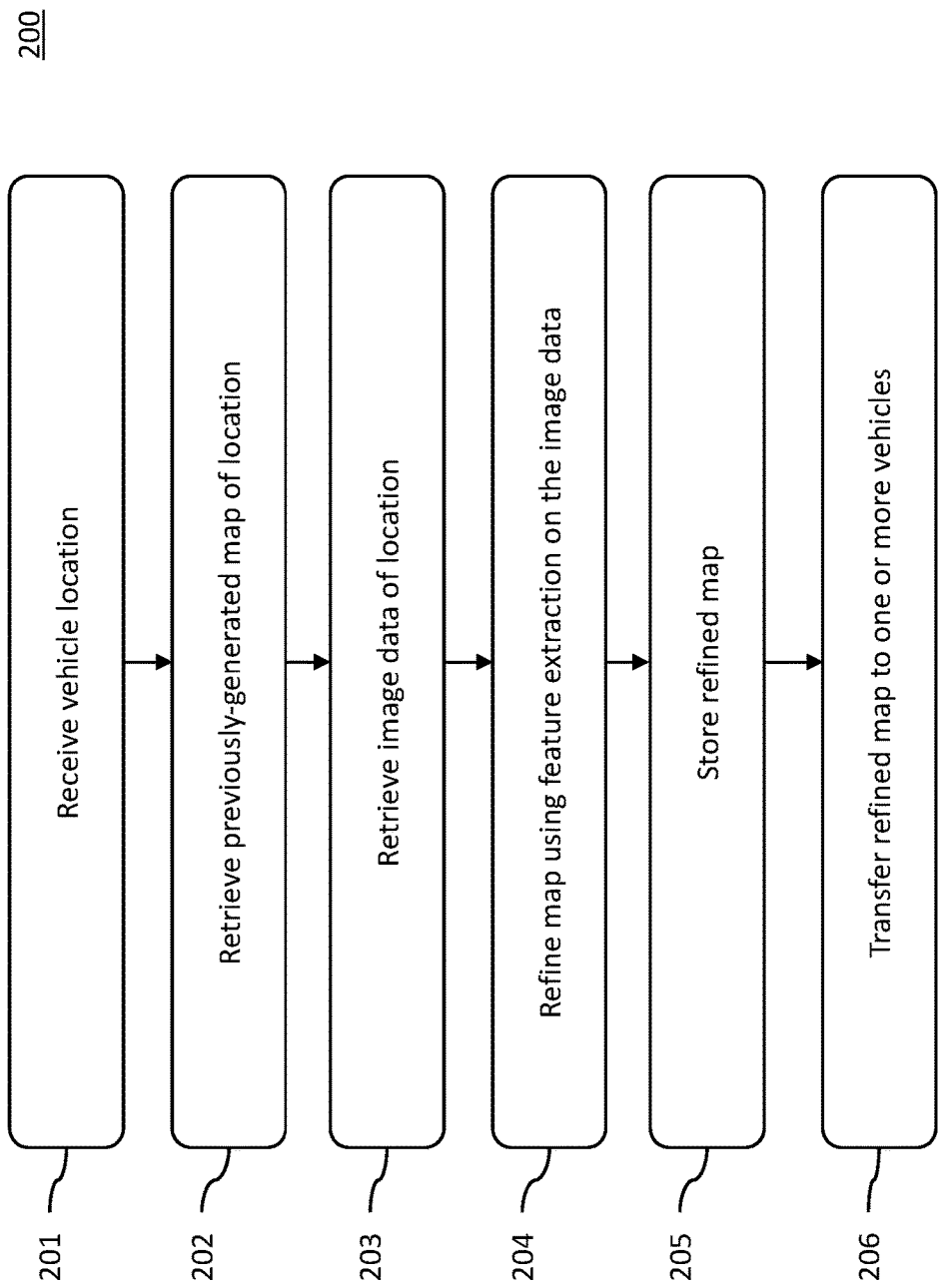
FIG. 2 depicts an exemplary method of providing refined maps of parking areas to one or more vehicles, according to examples of this disclosure.

FIG. 2 depicts an exemplary method 200 of providing refined maps of parking areas to one or more vehicles, according to examples of this disclosure. The method can begin by receiving a vehicle location (Step 201). The vehicle location can be transmitted by a vehicle (e.g., through a network) to processors remote to the vehicle. Next, in some embodiments, systems of the present invention can retrieve one or more previously-generated maps of the location (Step 202). Next, systems of the present invention can retrieve image data corresponding to the vehicle location (Step 203). The image data can include an image of a portion of the Earth's surface. This image could be a satellite image or an image captured by a drone, airplane, or the like. This image is ideally a high-resolution image, for example with resolutions as high as 30 cm. In some embodiments, systems of the present invention can retrieve such previously-generated maps and image data from local storage or from a remote storage location that the systems may be connected to through a network (e.g., the cloud). Such network connections and storage locations are well known in the art.

Next, the previously-generated map can be refined using feature extraction of the image data (Step 204). For example, the map can be refined using the method 300 described in reference to FIG. 3 below. Next, the refined map is stored (Step 205). In some examples, the refined map can be stored in a remote storage that may be connected through the network. Next, the refined map is transferred to or more vehicles (Step 206).

Figure 3:
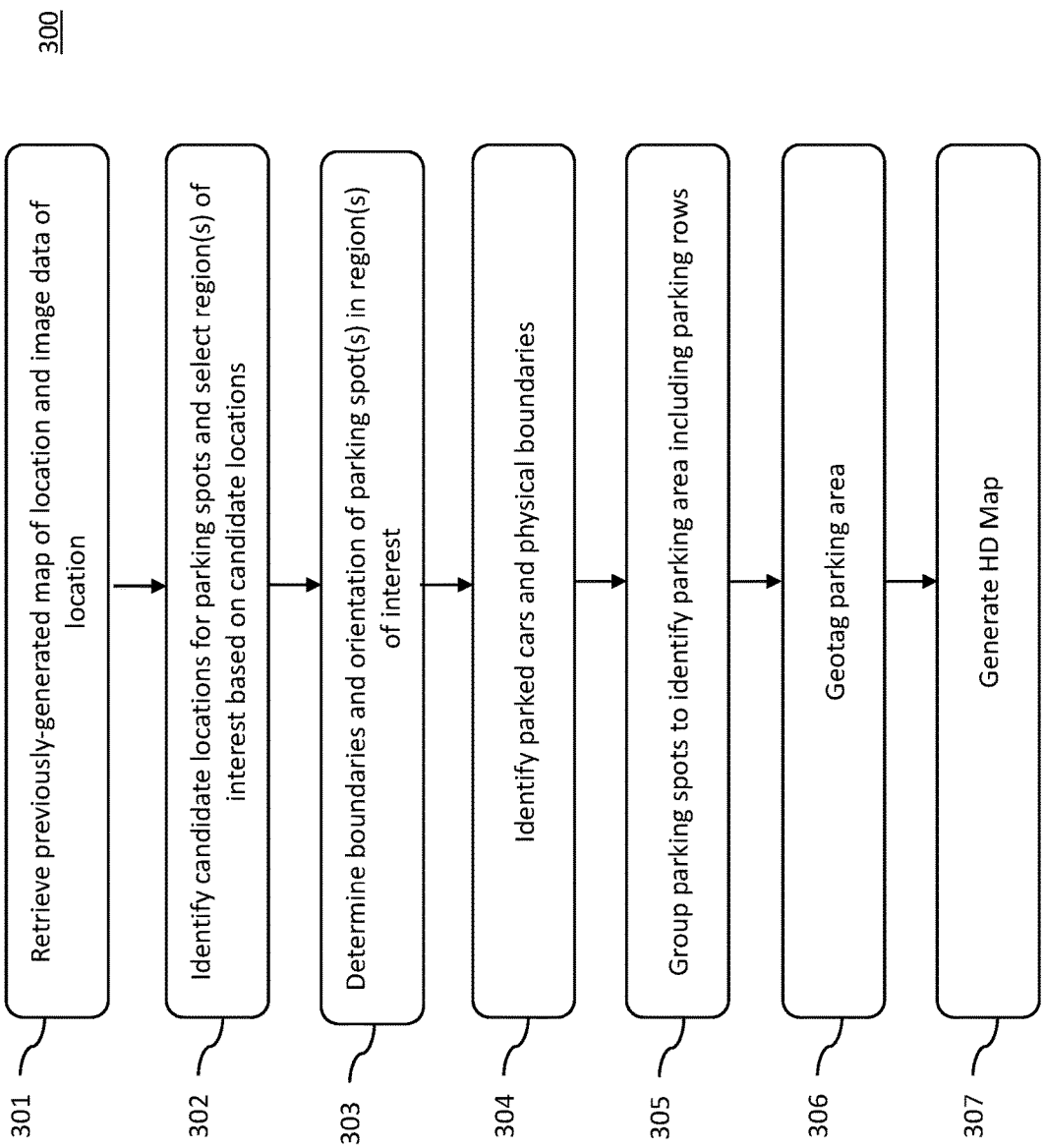
FIG. 3 depicts an exemplary method of refining maps of parking areas, according to examples of this disclosure.

FIG. 3 depicts an exemplary method 300 of refining maps (e.g., high definition (HD) maps) of parking areas (such as parking area 100) using feature extraction. The method can begin by retrieving a previously-generated map and image data corresponding to a vehicle location. This step can be similar to steps 201-203 of method 200 described above with reference to FIG. 2.

Next, a feature extraction algorithm can analyze the image to identify features of the image (Steps 302-305) such as, for example, parking lines 101, vehicles 102, and signage 103. Automatic extraction of parking lots from satellite images is nontrivial since the parking lots can be present in any non-canonical angles in the images. Each parking lot needs to be analyzed individually and the appearance of such parking lots is subject to large amount of variation.

The method described here uses a hierarchical framework for identifying parking lots from satellite and drone images. The identification of parking lots can be a two-step approach of first, low level parking spot identification followed by second, a semantic grouping of parking spots to identify parking areas (e.g., parking lots or structures).

As shown in FIG. 3, candidate locations for parking spots can be identified, and regions of interest can be generated based on the candidate locations (Step 302). A parking spot can be characterized with specific geometry associated with it. For example, a parking spot can have two parallel lines. A parking spot can additionally can have one or two horizontal lines substantially perpendicular to the vertical lines. In some examples, a set of templates for parking spots can be created. The template set can contain parking lot patches (e.g., portions of overhead images of parking spots) of different parking spot configurations at different orientations. As an initial estimate for locating parking lots, the system can perform a normalized cross correlation over the entire image using the parking spot patches. The locations in the image with highest correlation score are the candidate locations for the parking spots. The candidate locations are used as seed points for selecting the region of interest for further processing.

Next, boundaries and orientations of parking spots in regions of interest are determined (Step 303). For example, edge detection using Canny/Sobel edge detection can be performed on the region of interest. Since edge detection will detect building edges, fences, road boundaries and spurious noisy detections, they are filtered out by grouping the lines based on angles. The principal orientation can be determined using Random sample consensus (RANSAC).

Next, parked cars and other physical boundaries can be identified (Step 304). Since parking lots can also contain parked cars, the same patch-based correlation method can be used to identify parked cars. A grouping strategy can use similar angles to identify parking rows and subsequently the neighboring parking rows to constitute a parking lot (Step 305). If the parking rows fall within a distance threshold, they are labeled as belonging to the same parking area. In addition to recognizing parking areas, physical boundaries of parking areas such as walls or fences, pathways to access the parking spaces, and obstructions in the spaces can also be identified. For example, buildings in the aerial image can be detected by a classification algorithm using supervised learning method. Local image neighborhood-based feature extraction techniques such as SURF, Local binary pattern and Histogram of Gradients (HOG) features can be used on the image. Positive and negative sample feature vectors can be used to train the algorithm. The features can be input to support vector machines (SVM) to classify the image into buildings and non-building pixels. Once the buildings are identified by the classifier, the contour of buildings can be extracted in the neighborhood of determined parking lots.

The identified parking lots can then be labelled with a geotag (Step 306) by correlating the extracted features and boundaries with their GPS coordinates, which can be extrapolated from the metadata of the satellite/drone images.

The information gathered in Steps 302-306 can then be used to generate a high definition (HD) map of the parking lot (Step 307). The HD map is generated using the geotagged parking spots from Step 306, where each parking spot is associated with a Latitude, Longitude, Heading (LLH). The ends of parking lines 101 are localized in the map and an object corridor is created by fitting a line passing through all the parking line end points. Corridors of parking spaces can thus be created along all parking spot rows. Object corridors for other items in a parking lot (e.g., signs, barriers, structural components) can be generated.

Where there are no object corridors, driving corridors can be created. For example, a driving corridor can be created in between the two sets of parking lines 101 in FIG. 1. To ensure autonomous vehicles don't hit cars extending out of parking spaces, a safe margin away from any object corridors can be applied. For example, a safe margin of 1.5 meters can be applied, meaning the driving corridor must be 1.5 meters away from object corridors.

Any road marking identifiable from the aerial images can also be localized on to the map using a sign recognition algorithm. The building contours discussed above can also be localized on the map and tagged as object boundaries deeming it as the non-drivable space.

These high definition (HD) maps can then be stored, for example, in a database and distributed to individual vehicles and/or OEMs to deploy, for example, autonomous valet parking (AVP) technology.

Figure 4:
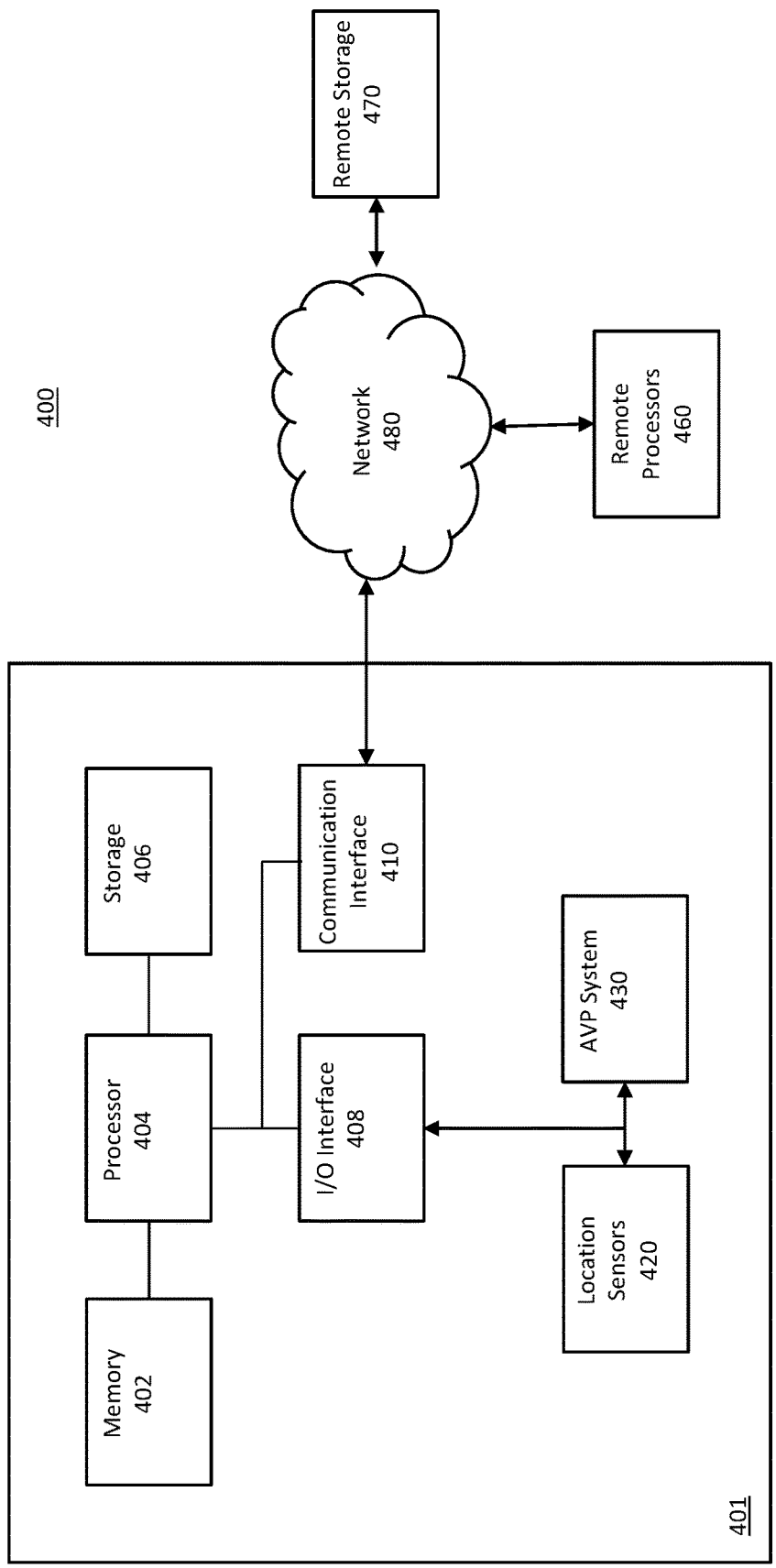
FIG. 4 depicts a block diagram of a system for refining maps for vehicles, according to examples of this disclosure.

FIG. 4 depicts a block diagram of a system for refining maps for vehicles, according to examples of this disclosure. For example, system 400 may be employed to perform the methods 200 and 300 described above with reference to FIG. 2 and FIG. 3, respectively. Referring to FIG. 4, system 400 may include a vehicle 401, the vehicle 400 may include, among other things, a memory 402, a processor 404, a storage 406, an input/output (I/O) interface 408, a communication interface 410, one or more location sensors 420, and an autonomous valet parking (AVP) system 430. At least some of these components of vehicle 401 may be configured to transfer data and send or receive data between or among each other.

Communication interface 410 may be configured to communicate with mobile terminal remote processors 460, and a remote storage 470 via network 480. Network 480 may be any type of wired or wireless network that may allow transmitting and receiving data. For example, network 480 may be a wired network, a local wireless network (e.g., Bluetooth™, WiFi, near field communications (NFC), etc.), a cellular network, an Internet, or the like, or a combination thereof. Other known communication methods which provide a medium for transmitting data are also contemplated.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors), such as processors 404 and 460 depicted in FIG. 4, that executes program instructions or modules stored in a memory or other non-transitory computer-readable storage medium or device (e.g., solid state storage devices, disk drives, etc.), such as storage 406 and remote storage 470 depicted in FIG. 4. The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system for refining maps for vehicles, the system comprising:
   one or more processors in communication with a vehicle;
   wherein the one or more processors are configured to:
      receive location data from the vehicle;
      retrieve map data associated with the location data, the map data including a previously-generated map;
      retrieve image data corresponding to the location data, the image data including an image of a portion of Earth's surface;
      perform feature extraction on the image data to identify one or more parking spots;
      generate a refined map by revising the previously-generated map to include the one or more parking spots;
      store the refined map as the map data associated with the location data; and
      transmit the map data associated with the location data to the vehicle.

2. The system of claim 1, the one or more processors further configured to transmit the map data associated with the location data to a plurality of vehicles.

3. The system of claim 1, wherein identifying the one or more parking spots comprises a low-level parking spot identification followed by a grouping of parking spots to identify a parking area.

4. The system of claim 3, wherein the low-level parking spot identification includes retrieving a set of parking spot templates and performing a normalized cross correlation over the image data using the parking spot templates.

5. The system of claim 4, wherein the parking spot templates comprise a plurality of parking lot patches, each patch corresponding to a unique configuration of parking lines.

6. The system of claim 4, wherein the grouping of parking spots includes identifying parking rows comprised of identified parking spots, and determining whether the identified parking rows fall within a distance threshold of one another.

7. The system of claim 3, wherein identifying the one or more parking spots further comprises identifying physical boundaries of the parking area.

8. The system of claim 1, wherein the image has a resolution of at least 30 cm.

9. The system of claim 1, wherein the processors in the vehicle are further configured to perform autonomous valet parking based on the received map data.

10. A method of refining a map, comprising:
determining a location of a vehicle;
retrieving a map associated with the location, the map being previously-generated;
retrieving an image of a portion of Earth's surface corresponding to the location;
performing feature extraction on the image to identify one or more parking spots;
revising the previously-generated map to include the one or more parking spots;
storing the revised map as the map associated with the location; and
transmitting the map associated with the location to the vehicle.

11. The method of claim 10, further comprising transmitting the map data associated with the location data to a plurality of vehicles.

12. The method of claim 10, wherein identifying the one or more parking spots comprises a low-level parking spot identification followed by a grouping of parking spots to identify a parking area.

13. The method of claim 12, wherein the low-level parking spot identification includes retrieving a set of parking spot templates and performing a normalized cross correlation over the image data using the parking spot templates.

14. The method of claim 13, wherein the parking spot templates comprise a plurality of parking lot patches, each patch corresponding to a unique configuration of parking lines.

15. The method of claim 12, wherein the grouping of parking spots includes identifying parking rows comprised of identified parking spots, and determining whether the identified parking rows fall within a distance threshold of one another.

16. The method of claim 12, wherein identifying the one or more parking spots further comprises identifying physical boundaries of the parking area.

17. The method of claim 10, wherein the image has a resolution of at least 30 cm.

18. The method of claim 10, further comprising performing autonomous valet parking based on the received map data.

19. A non-transitory computer-readable medium including instructions, which when executed by one or more processors, cause the one or more processors to perform a method comprising:
determining a location of a vehicle;
retrieving a map associated with the location, the map being previously-generated;
retrieving an image of a portion of Earth's surface corresponding to the location;
performing feature extraction on the image to identify one or more parking spots;
revising the previously-generated map to include the one or more parking spots;
storing the revised map as the map associated with the location; and
transmitting the map associated with the location to the vehicle.

* * * * *